Sept. 16, 1958  W. DOLL, JR  2,851,854
AFTERBURNER LINER
Filed Jan. 21, 1955

INVENTOR
WALTER DOLL JR.
BY Charles A. Warren
ATTORNEY

United States Patent Office 2,851,854
Patented Sept. 16, 1958

2,851,854

AFTERBURNER LINER

Walter Doll, Jr., Manchester, Conn., assignor to United Aircraft Corporation, East Hartford, Conn., a corporation of Delaware Application January 21, 1955, Serial No. 483,204

2 Claims. (Cl. 60—35.6)

This invention relates to a burner construction and particularly to an arrangement of a combustion chamber for an afterburner for a jet engine.

The walls of the combustion chamber in a gas turbine power plant or an afterburner are subject to extreme changes in temperature and the material forming the inner wall or flametube of the combustion chamber is frequently warped out of shape as a result of the heat from the combustion. One feature of the invention is an arrangement of the inner wall of the combustion chamber to resist warping. More particularly, a feature of the invention is the formation of circumferential corrugations in the wall of the afterburner.

When the combustion chamber walls are of double thickness thereby relieving the inner wall from a pressure differential on opposite sides of the wall, the two walls provide for a heat shielding for the parts surrounding the combustion chamber. With the double thickness of the walls, the differential thermal expansion between the inner and outer walls is substantial. Another feature of the invention is the attachment of the inner wall of the combustion chamber to the outer wall in conjunction with the corrugated inner wall in such a way as to permit relative expansion of the two walls to occur without overstressing either of the walls and without affecting the proper operation of the parts.

Other objects and advantages will be apparent from the specification and claims, and from the accompanying drawings which illustrate an embodiment of the invention.

Figure 1:
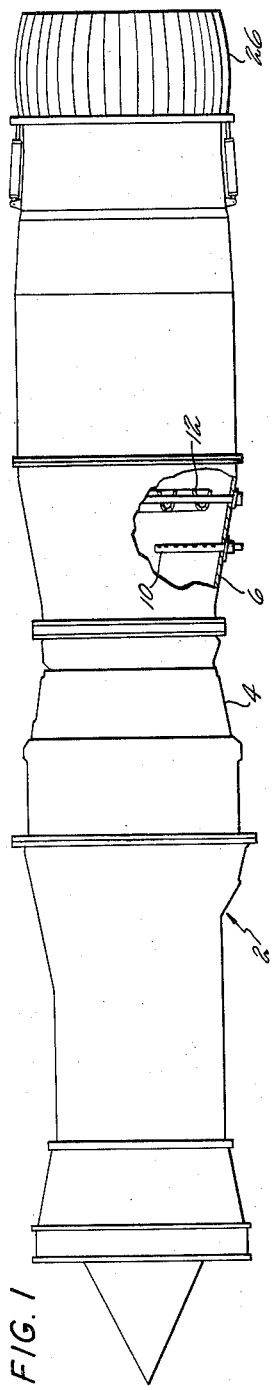
Fig. 1 is a side elevation of a power plant incorporating the invention.

The invention is shown in connection with a gas turbine power plant 2, the turbine 4 of which discharges exhaust gas into a duct 6. This duct forms the diffuser part of the afterburner through which the hot gas discharging from the turbine is directed to the thrust nozzle ring 8. The duct 6 is frusto-conical and increases in area in a downstream direction so that in this portion of the afterburner the cross-sectional flow area for the gas increases in area in a downstream direction to provide a diffuser action. In this duct 6 is a series of spraybars 10 for fuel, only one of which is shown and downstream of the spraybars is a flame-holder 12, the function of which is well understood.

At the downstream end of the duct 6 is attached the main afterburner case 14 which consists of an outer shell or wall 16 and an inner shell or wall 18. These walls are connected together at their upstream ends and are attached to the end of the duct 6 as by a row of bolts 20. The outer wall 16 extends rearwardly approximately to the nozzle 8 and is preferably convergent in the downstream direction although the upstream part of the wall 16 may be substantially cylindrical as shown. At the downstream end of the wall 16 is mounted a support ring 22 which is attached as by bolts 24 to the wall 16 and forms an extension of the wall. When the afterburner parts are not in operation, that is to say, when the parts are cold, the ring 22 has a portion 22a which is slightly spaced radially from the nozzle 8. When the nozzle ring 8 becomes hot from the flow of hot gas therethrough, the nozzle expands into contact with and is supported by portion 22a which obviously remains considerably cooler than the nozzle, since it is cooled by cooling air which flows in the annulus between walls 16 and 18.

Figure 2:
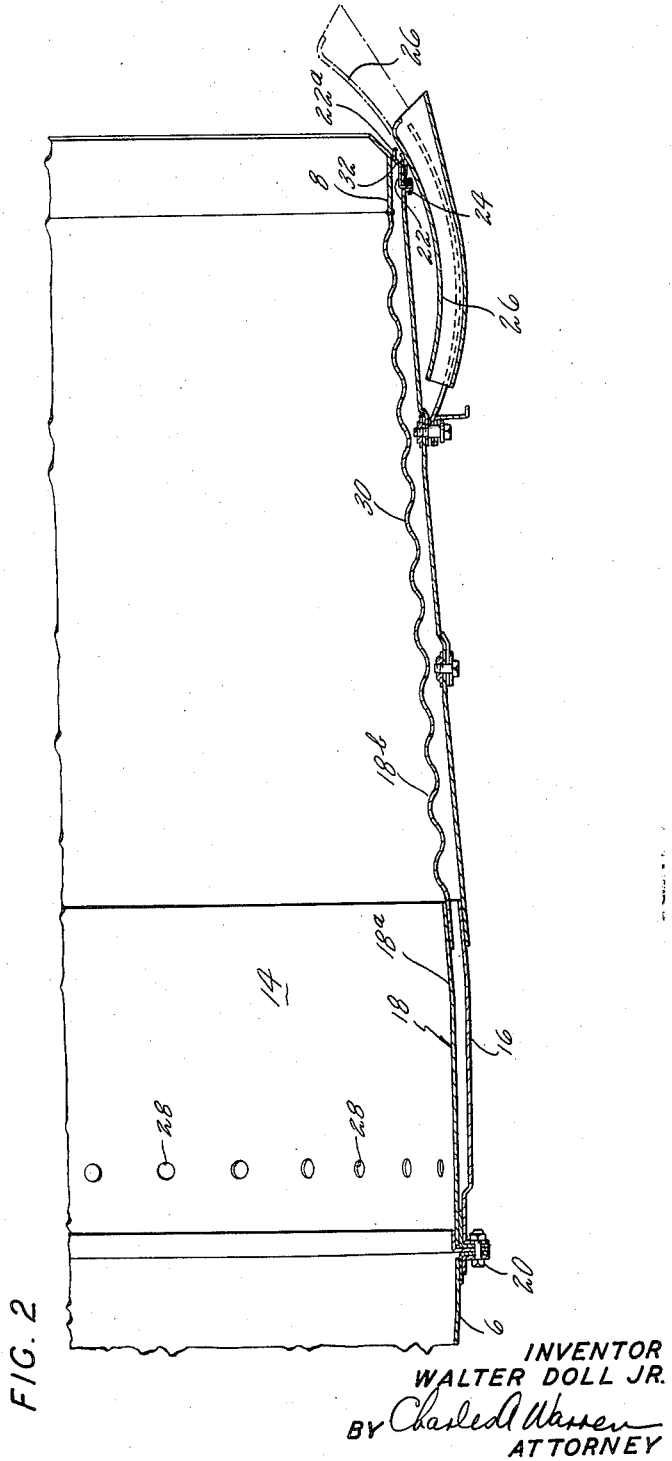
Fig. 2 is a fragmentary sectional view longitudinally through the afterburner showing the construction.

The outer wall 16 also may support a plurality of flaps 26 movable from the inoperative full line position of Fig. 2 into the dot-dash position in which the nozzle area is substantially reduced. The nozzle shown is not an essential part of the invention and is described and claimed in the co-pending application of Geary Serial No. 316,911, filed October 25, 1952.

The inner wall 18 extends within and spaced from the outer wall 16 and in substantially parallel relation to the outer wall. For about one-third of the length of the outer wall at the upstream end it is a smooth wall as shown. Adjacent the upstream end of this smooth portion 18a, a row of holes 28 is provided for the escape of gas from within the afterburner and into the space between the walls. The remaining portion 18b of the inner wall from the downstream end of the smooth wall portion 18a to the nozzle 8 is provided with a series of circumferentially extending corrugations 30. The corrugated portion 18b may be secured as by welding to the portion 18a of the inner wall and is secured as its downstream end, also preferably as by welding, to the nozzle ring 8. These corrugations 30 are made of sufficient depth so that they will constitute a substantial reinforcement of the inner wall to prevent the wall from warping during operation of the afterburner but are still sufficiently flat so as to prevent any substantial resistance to the flow of hot gas through the duct. For example, in a duct diameter of approximately thirty inches the depth of the corugations might be on the order of one half inch and the longitudinal spacing of the corrugations from peak to peak might be on the order of from three to four inches.

With a construction of this character, the afterburner may operate to burn additional fuel in the gas discharged from the turbine, this fuel being injected, as for example, through the spraybars 10 so that combustion will occur directly downstream of the flameholders 12. When combustion occurs, the inner wall 18 becomes very much hotter than the outer wall but axial expansion of the inner wall is permitted by the slidable support of the nozzle ring 8 by the supporting ring 22. With this arrangement the inner wall is free to expand axially although if for any reason the ring 22 should bind on the nozzle ring, the corrugations 30 are deep enough to permit a slight compression therein without overstressing either the inner or the outer wall. The relatively cool boundary layer air on the inner surface of the wall 6 enters the space between the inner and outer walls through the holes 28 thereby maintaining substantially the same pressure on opposite sides of the inner wall so that the latter is not subjected to pressure differential tending to expand the inner wall. The air entering the holes 28 flows axially between the walls and discharges either through the space between ring 22 and the nozzle ring or through holes 32 provided in the ring 22.

It would be understood that the nozzle area is constricted by the flaps 26 when additional fuel is not being discharged into or burned in the afterburner and that the full area of the nozzle ring 8 is used, by moving the flaps into the inoperative position shown, when additional fuel is being burned in the afterburner. These nozzle flaps may be controlled as described in the above-identified co-pending application of Geary Serial No. 316,911.

It is to be understood that the invention is not limited to the specific embodiment herein illustrated and described, but may be used in other ways without departure from its spirit as defined by the following claims.

I claim:

1. An afterburner construction for use with a jet engine including a divergent duct into which gas from the engine is discharged, means in said duct for injecting fuel into said duct, flameholding means upstream of the downstream end of said duct, a double wall combustion chamber attached to the downstream end of said duct including an inner and an outer wall, peripheral connecting means at the upstream ends of said walls for rigidly connecting said walls to each other and to said duct, said peripheral connecting means being readily detachable from outside said afterburner, said walls being radially spaced from each other except at their connected upstream ends to form an elongated unobstructed annular chamber closed at its upstream end, at least a part of the downstream portion of said inner wall which is exposed to said gas being imperforate and having a number of closely spaced circumferentially extending corrugations therein which are exposed to said gas, the upstream end portion of the inner wall being smooth and having openings therein adjacent said peripheral connecting means for the flow of gas from said duct outwardly into said annular chamber, a nozzle ring on the downstream end of said inner wall, a supporting ring surounding said nozzle ring and attached to the downstream end of said outer wall, said rings having relative sliding movement, and means associated with said supporting ring for the free escape of the gas flowing between said inner and outer walls.

2. An afterburner construction for use with a jet engine including a divergent duct into which gas from the engine is discharged, means in said duct for injecting fuel into said duct, flameholding means upstream of the downstream end of said duct, a double wall combustion chamber attached to the downstream end of said duct including spaced concentric inner and outer walls, peripheral connecting means at the upstream ends of said walls for rigidly supporting each of said walls in cantilevered relation to the downstream end of said duct, said peripheral connecting means being readily detachable from outside said afterburner and constituting the sole connection between said walls throughout their length, whereby said inner wall is free to expand at any point along its entire length and at any point on its circumference relative to said outer wall, said walls being radially spaced from each other except at their upstream supported ends to form an elongated annular chamber closed at its upstream end and unobstructed throughout the length of said walls, at least a part of the downstream portion of said inner wall which is exposed to said gas being imperforate and having a number of closely spaced circumferentially extending corrugations therein which are exposed to said gas, the upstream end portion of the inner wall being smooth and having openings therein adjacent said peripheral connecting means for the flow of relatively cool boundary layer gas from said duct outwardly into said annular chamber, the corrugations of said inner wall being radially spaced from said outer wall to maintain an unobstructed annular passage for said cooling gas flow from end to end of said chamber, a nozzle ring on the downstream end of said inner wall, a supporting ring surounding said nozzle ring and attached to the downstream end of said outer wall, said rings having relative sliding movement, and means associated with said supporting ring for permitting the free discharge of said cooling gas stream from said chamber through said rings.

References Cited in the file of this patent

UNITED STATES PATENTS

| | | |
|---|---|---|
| 707,216 | Duc | Aug. 19, 1902 |
| 710,130 | Weiss | Sept. 30, 1902 |
| 2,615,300 | Lombard | Oct. 28, 1952 |
| 2,639,578 | Pouchot | May 26, 1953 |
| 2,640,317 | Fentress | June 2, 1953 |
| 2,702,452 | Taylor | Feb. 22, 1955 |
| 2,722,801 | Lombard | Nov. 8, 1955 |
| 2,794,319 | Stockdale | June 4, 1957 |